United States Patent Office 3,270,661
Patented Sept. 6, 1966

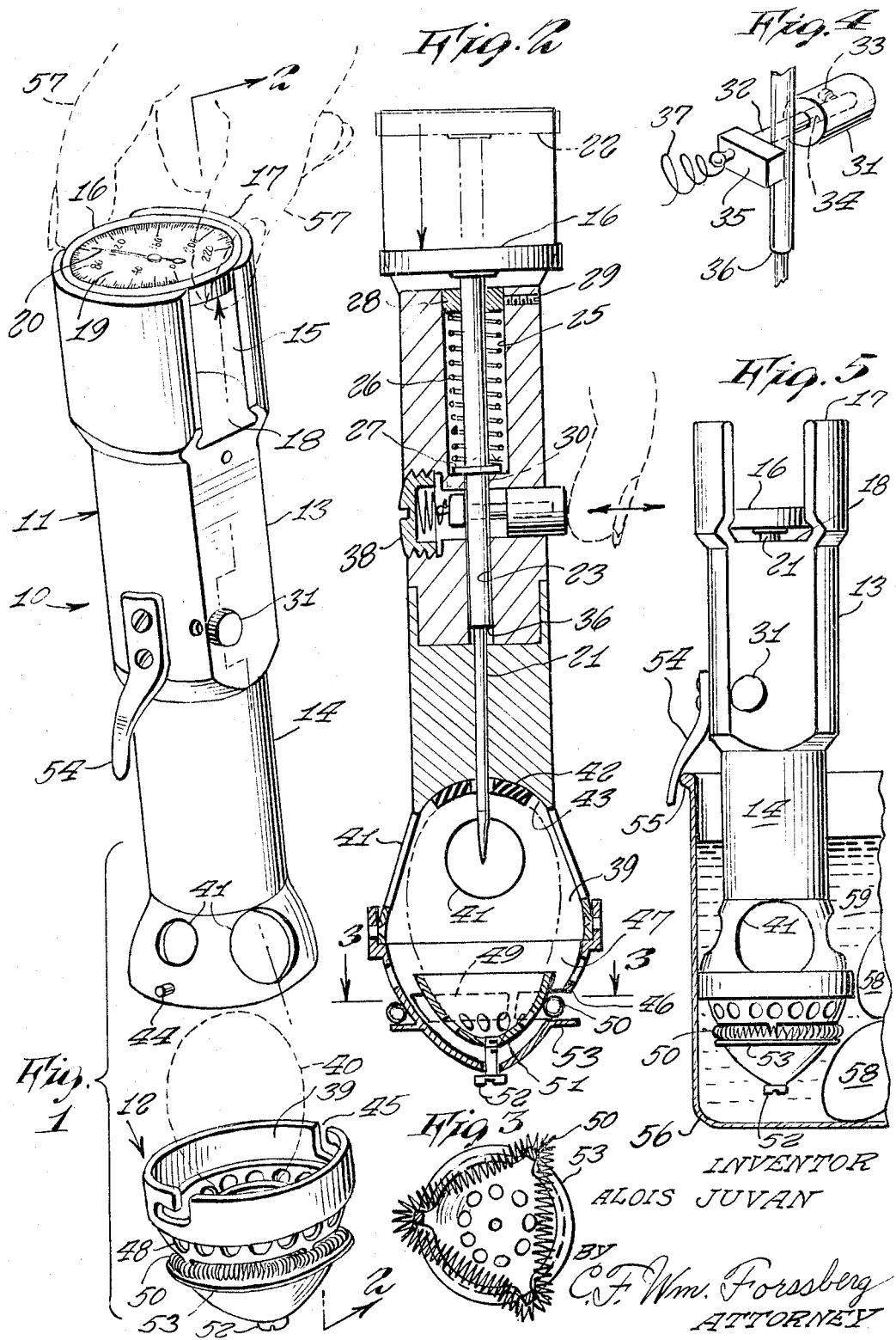

3,270,661
EGG COOKING DEVICE
Alois Juvan, 5953 Madison St., Brooklyn, N.Y.
Filed June 7, 1965, Ser. No. 461,784
3 Claims. (Cl. 99—343)

This invention relates generally to culinary tools. More specifically it relates to devices for cooking eggs.

It is generally well known to those skilled in the art that cooking of eggs to a desired amount is not easy and it depends considerably on trial and error with conventional cooking tools to accomplish that the eggs be made soft boiled, hard boiled and the like.

Accordingly it is an object of the present invention to provide a novel egg cooking device having means to indicate the degree of temperature within the center of the egg during the cooking process thereby informing a person when the egg is sufficiently cooked and when it should be removed from further cooking before it is over done.

Another object is to provide an egg cooking device that can be immersed into a cooking vessel wherein a plurality of eggs may be cooked and wherein the egg cooking device indicates the temperature within only one of the eggs being cooked, thus indicating the temperature within all the other eggs to let a person know when all the eggs are properly cooked.

Other objects are to provide an egg cooking device that is simple in design, inexpensive to manufacture, rugged in construction, easy to use and efficient in operation.

These and other objects will be readily apparent upon a study of the following specification and the accompanying drawing wherein:

FIGURE 1 is an exploded perspective view of the elements comprising the present invention.

FIGURE 2 is a cross sectional view taken on line 2—2 of FIGURE 1 showing the elements assembled.

FIGURE 3 is a cross sectional view taken on line 3—3 of FIGURE 2.

FIGURE 4 is a fragmentary perspective view of the catch mechanism, and

FIGURE 5 is a side elevation view of the device shown in operative use.

Referring now to the drawing in detail, the numeral 10 represents an egg cooking device according to the present invention wherein there is a main body element 11 and an end cap element 12.

The main body element is of generally cylindrical configuration and includes a machined or formed housing 13 made from plastic material or the like and a metal cylinder 14 secured to one end of the housing.

The housing 13 is bored out at one end to form a cup 15 within which a disc type temperature gauge 16 is slideable between the rim 17 of the cup and the base 18 thereof. The gauge has a dial 19 and indicating needle 20 on the upper side thereof. A pointed prong 21 is affixed to the rear side 22 of the gauge and extends through a central opening 23 in the housing and central opening 24 aligned therewith in the metal cylinder. The opening 23 is counterbored at its upper portion as shown at 25 to contain a compression coil spring 26 the lower end of which bears against a disc 27 rigidly secured to the prong. The upper end bears against a collar 28 fitted into the upper end of the counterbore and secured therein by a set screw 29.

A transverse opening 30 in the housing is made on an axis that passes to one side of the central opening 23. A push button 31 is fitted in opening 30. A rod 32 is secured by a set screw 33 in a central opening 34 in the push button. A cross arm 35 is integrally formed on the rod 32 the upper edge of which is engageable under a shoulder 36 on the prong. A compression coil spring 37 has one end bearing against the cross arm normally urging the push button outward of the housing. The other end of the coil spring bears against a screw 38 threaded in one end of the transverse opening 30.

The terminal end of the metal cylinder is flared outwardly to form a cavity 39 within which an egg 40 may be placed. Openings 41 in the wall of the cavity allow circulation of water into the cavity and around the egg.

A rubber pad 42 is secured to the upper wall 43 of the cavity so as to cushion the egg.

The metal cylinder has a pair of studs 44 which engage in bayonet slots 45 on the end cap element for securing the elements together.

The end cap element is generally of hemispherical configuration comprising a thin wall 46 surrounding a central cavity 47. Openings 48 in the wall 46 permit water to circulate into the cavity. Three latitudinal slots 49 around the wall 46 are made and an endless tension coil spring 50 is fitted around the end cap and within the slots. An end cup 51 is secured over the lower end of the end cap and secured thereto by a screw 52. A flange 53 on the end cap prevents the spring 50 from falling off.

A hook 54 mounted on the side of the housing provides a means to mount the device over the rim 55 of a cooking pot 56.

In operative use the end cap is removed from the main body element.

The temperature gauge is grasped between fingers 57 and pulled upwardly as shown in FIGURE 1 until the cross arm snaps under the shoulder 36, thus securing the prong in retracted position. An egg is placed into cavity 39 and the end cap is secured to the main body element. The device is suspended on the rim of a pot as shown in FIGURE 5 wherein additional eggs 58 are cooking within water 59.

The push button is pressed as shown in FIGURE 2 thus causing the pointed end of the prong to pierce through the shell of the egg and extend into the center thereof. The temperature within the egg is transmitted through the prong to the gauge.

It is to be noted that the spring 50 and pad 42 provide shock absorbing means during the plunging of the prong into the egg to prevent the egg from cracking up. As shown in FIGURE 3 the spring 50 extends at three portions into the cavity 47 and supports at these points the lower end of the egg. Upon shock caused by plunging of the prong these spring portions move radially outward.

While various changes may be made in the detail construction, it is understood that such changes will be limited to the spirit and scope of the invention as is defined in the appended claims.

I claim:

1. In an egg cooking device the combination of a cylindrical main body element and an end cap element, a longitudinal central opening through said main body element, said end cap element being removably mounted on one end of said main body element, an enlarged cavity formed within said end of said main body element and said end cap mounted thereon for receiving an egg therein, a prong slidable within said central opening, a temperature gauge at one end of said prong, the opposite end of said prong being slidable into and out of said cavity, and openings in the wall around said cavity to allow entry of water therein.

2. In an egg cooker the combination as set forth in claim 1 wherein said prong has a disc, a compression coil spring bearing on said disc to urge said prong into said cavity, and a catch for arresting said prong against movement by said compression coil spring.

3. In an egg cooker the combination set forth in claim 2 wherein said end cap element has a plurality of latitudinal slots therearound, and an endless tension coil spring is fitted around the outer side of said end cap, said endless spring resting within said slots, portions of said endless spring passing across a cord of said cavity to form a resilient support for the lower end of said egg.

References Cited by the Examiner

UNITED STATES PATENTS 2,276,178  3/1942  Ford _____ 99—321

FOREIGN PATENTS 650,459  3/1928  France.

WALTER A. SCHEEL, *Primary Examiner.*